(No Model.)
L. ST. ORES.
TWO WHEELED VEHICLE.
No. 327,036. Patented Sept. 29, 1885.
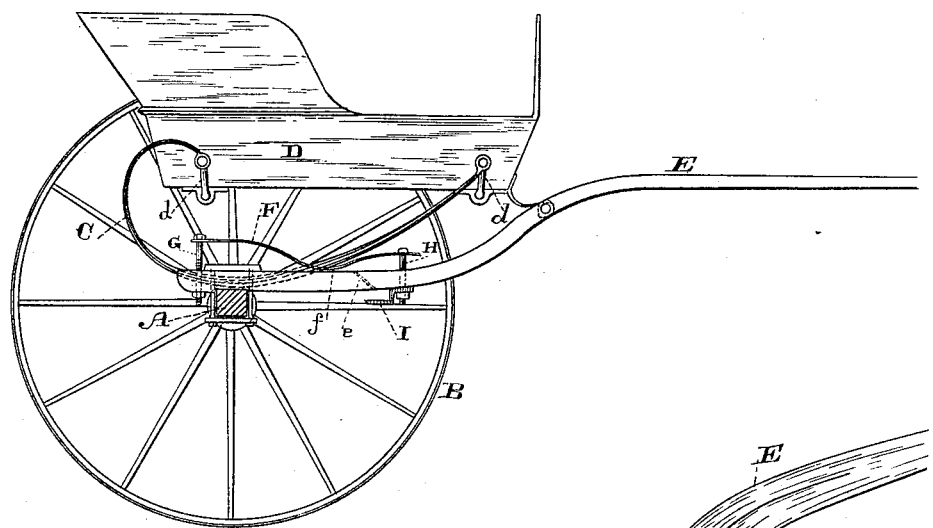
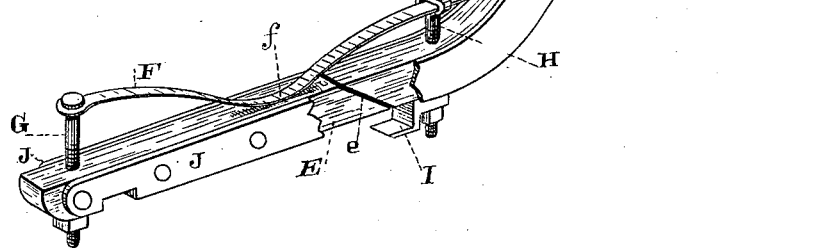
Witnesses,
Geo. H. Strong.
J. H. Towne.
Inventor,
Lewis St Ores
By
Dewey & Co.
Attorneys

UNITED STATES PATENT OFFICE.

LEWIS ST. ORES, OF GUADALOUPE, CALIFORNIA.

TWO-WHEELED VEHICLE.

SPECIFICATION forming part of Letters Patent No. 327,036, dated September 29, 1885.

Application filed May 25, 1885. (No model.)

*To all whom it may concern:*

Be it known that I, LEWIS ST. ORES, of Guadaloupe, Santa Barbara county, State of California, have invented an Improvement in Two Wheeled Vehicles; and I hereby declare the following to be a full, clear, and exact description of the same.

My invention relates to that class of two-wheeled vehicles commonly known as carts; and my invention consists in a peculiarly-divided sectional shaft, and in details of construction relating to the adjustment or control, the limitation, and the guiding of the joint formed between the sections, all of which I shall hereinafter fully explain.

The object of my invention is to do away with the unpleasant rocking motion which the body receives from the shafts, and which is occasioned by the jogging of the horse.

Referring to the accompanying drawings Figure 1 is a side elevation of my cart, Fig. 2 is a perspective view of my shaft, one of the side strips being broken to show the miter cut.

A is the axle of the cart, and B its wheels. C are the springs, clipped solidly to the axle, and D is the body of the cart. The body is mounted by means of the crank-shafts d, which are pivoted in the ends of the springs and are journaled in suitable bearings under the body.

E are the shafts, of the usual curved-pattern found in buggies. The rear ends of these shafts are clipped solidly to the axle. The shaft, as shown in Fig. 2, is cut at any suitable portion, preferably at its depressed part, the division being made on a bevel or miter line, as shown at e.

F is a spring, curved at f, where it bears on the top of the rear section of the shaft. Its raised rear end has a bolt, G, passing through it and through the shaft. Its forward end crosses the division-line of the shaft and passes loosely through the eye of an eyebolt, H, which passes through the rear end of the forward section of the shaft.

On the lower end of the eyebolt is secured an angled strip or lug, I, the rear end of which is adapted to bear under the forward end of the rear section of the shaft.

Bolted to each side of the rear section of the shaft are the guide-strips J, which extend forwardly on the sides of the forward section, and are pivoted thereto by means of a bolt, j, which passes through their forward ends and the intervening shaft.

The object of dividing the shaft by a miter cut is to provide an abutment for the ends of the sections, so that when the shaft receives any direct weight, as by stepping upon it, the sections simply move together and support each other. The object of the spring F is to control the movement of the divided sections, while allowing them to have the necessary play. By reason of the curve f of the spring I am enabled to regulate its tension by setting the bolt G, which is at its rear end. The lug or strip I under the shaft acts as a stop to limit the upward movement of the forward section. As this section moves up the rear end of the lug, coming in contact with the rear section, limits the movement. The side strips, J, act as guides for the sections and as guards for the joint. Being pivoted at their forward ends, they do not interfere with the free play of the forward section. The effect of a divided shaft in vehicles of this class is well known, and I need not therefore describe its general operation any more than to say that the up and down motion of the forward section of the shaft is not communicated to the rear section, and therefore the oscillation of the axle and body is prevented.

Having thus described my invention, what I claim as new, and desire to secure by Letters Patent, is—

1. In a two-wheeled vehicle, the shaft E, divided into sections by a bevel or miter cut corresponding in inclination in each section, in combination with the curved spring F, bearing on top of the rear section, the eyebolt H, on the forward section, through which the elevated forward end of the spring passes, and the bolt G, through the elevated rear end of the spring, for regulating its tension, substantially as herein described.

2. In a two-wheeled vehicle, the shaft E, divided into sections by a bevel or miter cut corresponding in inclination in each section, in combination with a curved spring, F, bearing on top of the rear section, the eyebolt H, on the forward section, through which the elevated forward end of the spring passes, the bolt G, through the elevated rear end of the spring, for regulating its tension, the angled limiting-lug I, secured on the rear end of the bolt H, and adapted to bear under the forward end of the rear section, and the side guide-strips, J, secured to the rear section and pivoted to the forward section, substantially as herein described.

In witness whereof I have hereunto set my hand.

LEWIS ST. ORES.

Witnesses:
C. D. COLE,
J. H. BLOOD.